(12) United States Patent
Clark, Jr.

(10) Patent No.: US 6,261,074 B1
(45) Date of Patent: Jul. 17, 2001

(54) METHOD AND APPARATUS FOR MAKING A MULTI-COLORED INJECTION-MOLDED PRODUCT

(75) Inventor: Franklin T. Clark, Jr., Girard, PA (US)

(73) Assignee: Emsco Inc., Girard, PA (US)

( * ) Notice: Subject to any disclaimer, the term of this patent is extended or adjusted under 35 U.S.C. 154(b) by 0 days.

(21) Appl. No.: 08/938,536

(22) Filed: Sep. 26, 1997

(51) Int. Cl.⁷ ................................................. B29C 45/16
(52) U.S. Cl. ........................ 425/130; 264/75; 366/76.1; 366/77; 425/573
(58) Field of Search .................... 425/130, 132, 425/133.1, 573; 264/73, 75; 366/76.1, 77

(56) References Cited

U.S. PATENT DOCUMENTS

| | | | |
|---|---|---|---|
| 4,183,673 | * | 1/1980 | Easley et al. .......................... 366/76 |
| 4,249,875 | * | 2/1981 | Hart et al. .......................... 425/133.1 |
| 4,315,724 | * | 2/1982 | Taoka et al. .......................... 425/130 |
| 5,387,381 | * | 2/1995 | Saloom .................................. 425/132 |

* cited by examiner

*Primary Examiner*—Tim Heitbrink

(57) ABSTRACT

A method and apparatus for making a multi-colored, injection molded product. A nozzle which has at least two separate feed passageways receives the primary resin stream from the primary feed tube. Two separate fluid-operated cylinders add different colorant masses to the separate portions of the feed stream through lateral openings into the two passageways. Blending of the two different masses is prevented in the nozzle and blending with the primary resin stream is minimized during feed to the mold to optimize the brightness of the colors in the end product.

6 Claims, 4 Drawing Sheets

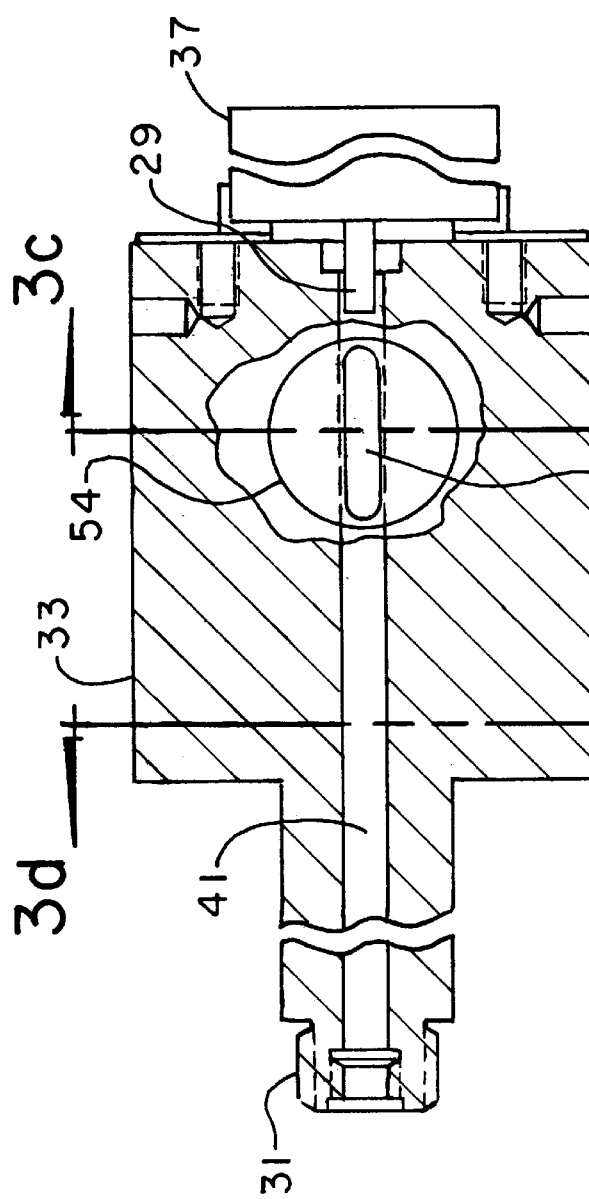
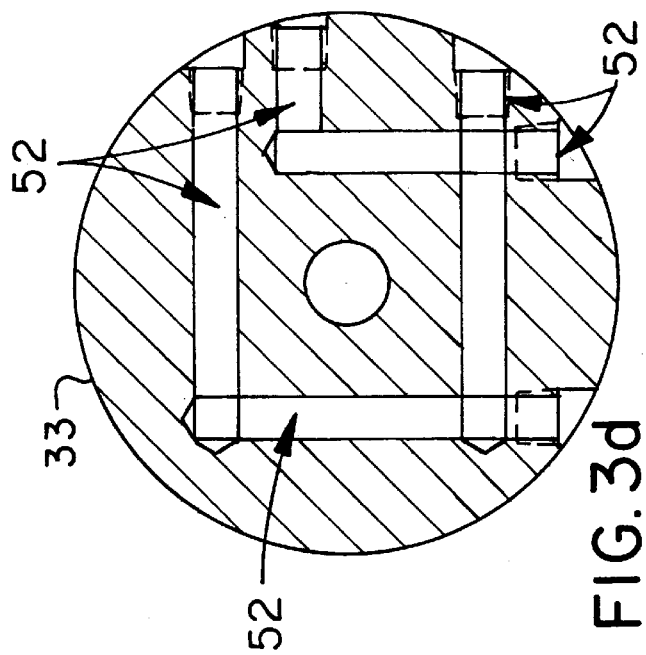
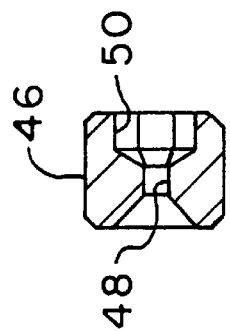
FIG. 3d
FIG. 3b
FIG. 3e

METHOD AND APPARATUS FOR MAKING A MULTI-COLORED INJECTION-MOLDED PRODUCT

The present invention relates to the manufacture of injection-molded products. More particularly, the present invention relates to a method and apparatus for manufacturing multi-colored, injection-molded products.

Various devices are known for the making of multi-colored injection-molded parts. For example, one such device is taught in U.S. Pat. No. 4,183,673 issued to Easley et al. Easley et al. teaches the use of a reciprocating extruding screw with a plurality of injectors for adding colors to the main stream of material. Easley et al. teaches the use of injecting pressures of at least three times (preferably 3600 psi) the maximum internal pressure within the feed screw housing, which is nominally 1000 psi. Another specific teaching is that color dye must be injected where the feed screw is operative. Finally, it would seem both a desired feature and a necessary result of the Easley et al. configuration that the two colors injected would be intermixed, an undesirable result for the products of the present invention.

U.S. Pat. No. 4,315,724 to Toaka et al. discloses a device for producing multi-colored injection-molded products that utilizes a combining cone that receives colorized molten material from three or more identical feed screws. This means added expense since each feed device must be capable of moving molten resin. In addition, to produce a fully marbleized product of the type depicted in FIG. 14, timed release from a series of valves is necessary. The use of such valves and timing mechanism increases the cost significantly.

U.S. Pat. No. 5,387,381 Saloom teaches the use of apparatus for producing multi-colored extruded product by adding color pellets into one of two feed streams of material. Saloom's two feeders are, otherwise, identical. The accent color beads soften at a higher temperature than the base material during the extrusion process and produce a color streak in the base material (e.g., simulated wood grain). This duplication of feeders increases the expense of the apparatus and process.

The method and apparatus of the present invention produces a multi-colored, injection-molded product much more simply and inexpensively than previous attempts. An injection nozzle having multiple passageways that each substantially receive equal portions of the molten feed stock is positioned downstream of the primary feed tube. Each of the multiple passageways has a laterally extending opening that has connected thereto a fluid piston that introduces a colorant into the primary feed stream. Each portion of colorant is carried along with the primary feed stream with a minimum of blending so that the end product has a splash of each of the added colors in addition to the color of the primary feed stream. High pressure injection and expensive injection systems, valves, timers, etc., are unnecessary.

The method of making a multi-colored, injection-molded part which is used in the present invention comprises the steps of feeding a primary molten resin stream through a nozzle which has at least two parallel passageways each said passageway receiving substantially equal amounts of said primary molten stream; injecting a mass of a first color pigment into a first of said at least two passageways so that said mass of a first color pigment is conveyed along by said primary molten stream; injecting a mass of a second color pigment which is a different color from said first color pigment into a second of said at least two passageways so that said mass of said second color pigment is carried along by said primary molten stream substantially independently of said first mass of said color pigment; injecting said primary molten stream carrying along said first mass of color pigment and said second mass of a different color pigment into an injection mold in such a manner that there is little or no blending of said two masses of color pigment with said primary molten stream or with each other. In addition, the first and second masses of color pigment are selected from a group consisting of i) liquid colorant, ii) powdered colorant, and iii) a concentrated pelletized colorant.

The method and apparatus of the present invention permit the manufacture of multi-colored, injection-molded parts much more inexpensively and easily than previous devices. Colors can be added to a primary resin stream without duplication of expensive primary feed systems, without the need for controllable valves or complicated timing mechanisms. Further, color can be added with a minimum of blending to produce a more attractive multi-colored product.

Various other features, advantages and characteristics of the present invention will become apparent after a reading of the following specification.

BRIEF DESCRIPTION OF THE DRAWINGS

The preferred embodiments are described in connection with the following figures, like elements bearing like reference numerals and, in which

FIG. 2b is an end view of the embodiment shown in FIG. 2a,

FIG. 3b is a cross-sectional top view as seen along line 3b—3b in FIG. 3a;

FIG. 3d is a cross-sectional end view of the feeder as seen along line 3d—3d in FIG. 3b;

FIG. 3e is a cross-sectional side view of an orifice plug used in conjunction with the color adding apparatus of the present invention.

DETAILED DESCRIPTION OF THE PREFERRED EMBODIMENT(S)

Figure 1:
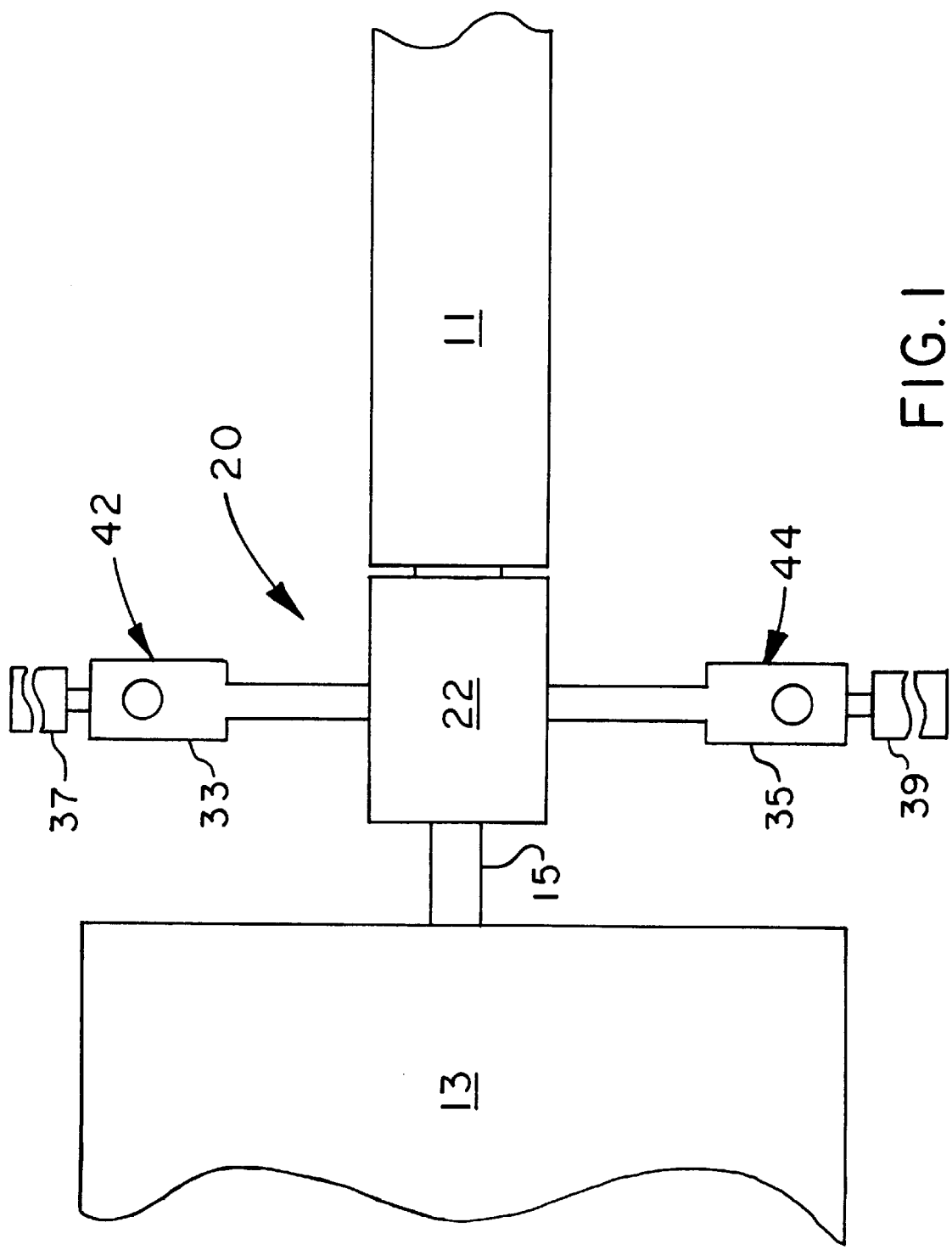
FIG. 1 is a schematic top view of an injection molding system employing the method and apparatus of the present invention.

A first embodiment of the present invention is shown in FIG. 1 generally at 20. The color adding apparatus 20 of the present invention is positioned between a primary feed tube 11 and an injection mold 13. Primary feed tube 11 can be of any conventional type such as a reciprocating feed screw, for example. The injection mold 13 will be configured to mold one or more multi-colored parts. The primary resin stream fed from feed tube 11 will have a base color to which additional different pigments are added using apparatus 20. Apparatus 20 includes a specially configured nozzle 22 and at least two auxiliary colorant (or pigment) feed units 42 and 44.

Figure 2A:
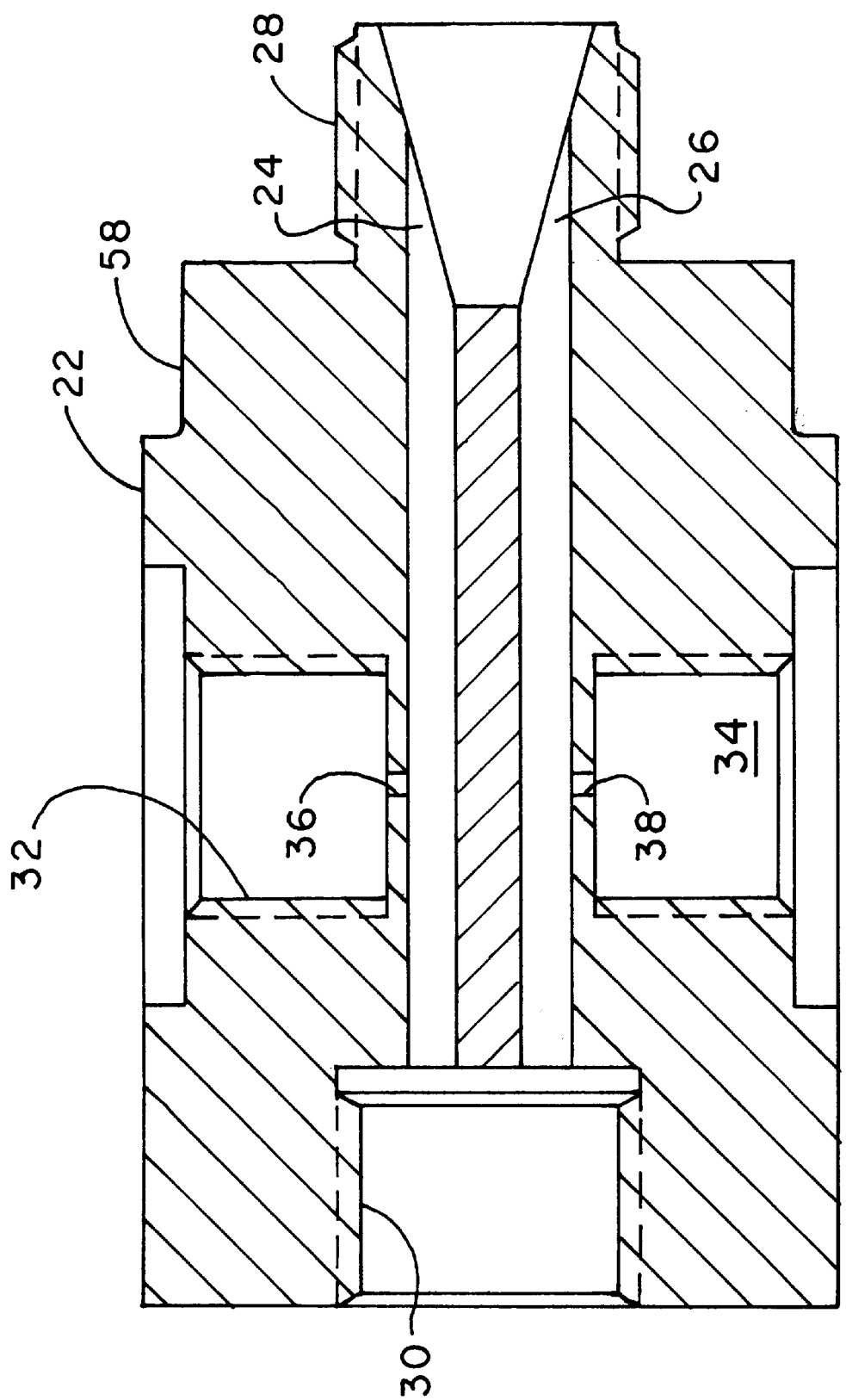
FIG. 2a is a cross-sectional top view of a preferred embodiment of the nozzle of the present invention.
Figure 2B:
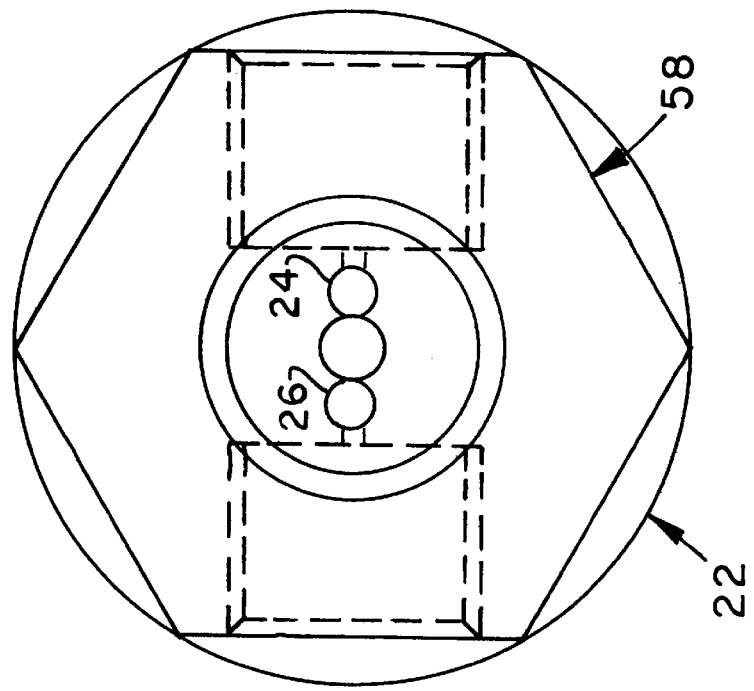

As best seen in FIGS. 2a and 2b, nozzle 22 has a first passageway 24 and a second parallel passageway 26 that receive substantially equal amounts of resin from the primary resin stream fed by feed tube 11. Nozzle 22 has an externally threaded protrusion 28 that is mated with an opening in primary feed tube 11, while the downstream end of nozzle 22 is provided with an internally threaded opening 30 that receives a threaded end of feed tube 15 (FIG. 1) which formerly was received in the opening in feed tube 11. Nozzle 22 has a hexagonal section 58 formed on a portion of its length to facilitate its connection to upstream and downstream elements by enabling it to be rotated into threaded engagement and then held as the downstream member is threaded into it. This design of nozzle 22 creates the least disruption and requires the least modification to the existing equipment. Although nozzle 22 has been depicted as having only two passageways 24, 26, it will be appreciated that nozzle 22 might have three or four such passageways, each receiving substantially equal amounts of resin from the primary flow stream.

First passageway 24 has a first lateral opening 32 interconnected thereto by orifice 36 while second passageway 26 has a second lateral opening 34 interconnected thereto by orifice 38. Auxiliary feed units 42 and 44 (FIG. 1) comprise a feed cylinder 33, 35 and a fluid-operated piston cylinder 37, 39. Feed units 42 and 44 are identical and, accordingly, only one will be described in detail (FIG. 3b) An end 31 of a first feed cylinder 33 is threaded into first lateral opening 32 and, similarly, an end of a second feed cylinder 35 is threaded into opening 34. Fluid-operated cylinders 37 and 39 are attached to the ends of feed cylinders 33 and 35, respectively, so that piston 29 may travel through passageways 41 in feed cylinders 33 and 35. Fluid-operated piston cylinders 37 and 39 are conventional devices and may be operated by either pneumatic or hydraulic fluid. The lengths of cylinders 37 and 39 are substantially equal to the lengths of feed cylinders 33 and 35 such that each piston 29 will have adequate length to extend throughout the length of passageway 41.

Figure 3A:
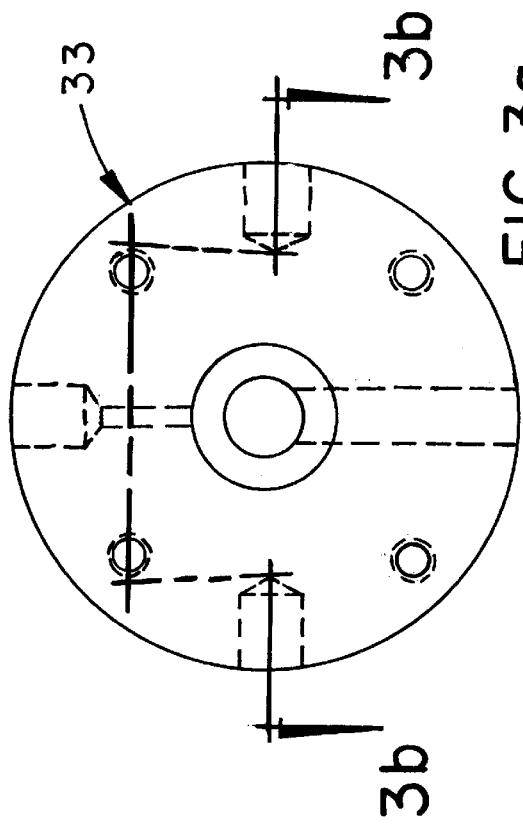
FIG. 3a is an end view of an auxiliary feeder used with the nozzle of the present invention.
Figure 3C:
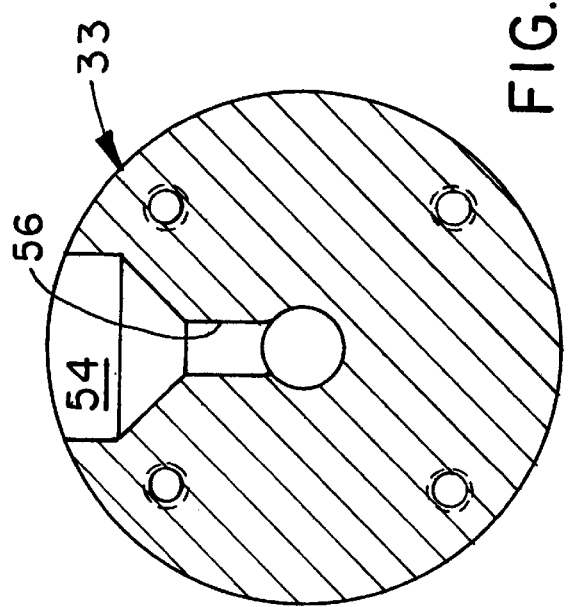
FIG. 3c is a cross-sectional end view of the feeder as seen along line 3c—3c in FIG. 3b.

The end of each feed cylinder 33, 35 is equipped with an orifice plug 46 (FIG. 3e). Orifice plugs 46 are used to help control the flow of colorant from feed cylinders 33 and 35 into passageways 24 and 26. The size of orifice 48 in plug 46 will need to be altered to accommodate the various types of colorant used which include liquids, powders, and pelletized concentrates. Plug 46 has an internal hex 50 formed in one side so that the plug can be easily inserted and removed from feed cylinders 33 and 35 to facilitate changing out the plugs 46 with different sized orifices 48. Actual flow rates and amounts of colorant fed into passageways 24 and 26 are controlled by the length and rate of movement of piston 29 in passageway 41.

The pelletized concentrates, which are used with the preferred embodiment, typically contain a resin-based material that is compatible with the resin of the primary resin stream, albeit in very dilute proportions (e.g., 1 part resin in 1000 parts colorant). A liquid coolant is circulated through passageways 52 of feed cylinder 33 to keep its temperature below the melting point of the resin-based colorant. Otherwise, the colorant would become tacky and tend to jam up the feed cylinder including hopper 54. Hopper 54 has an elliptical throat 56 whose major axis aligns with passageway 41.

In operation, colorant is charged into feed cylinders 33, 35 through hopper 54 with piston 29 retracted into cylinder 37. As piston 29 is extended out of cylinder 37 and pushes the pellets through cylinder 33, they are liquified by a coil heater (not shown) that is wrapped about the smaller diameter portion of feed cylinders 33, 35. When used with liquid colorant, the liquid cooling system and the coil heater can be disabled. The reason pelletized, resin based colorant is preferred is that any additive to a resin is, in effect, a pollutant and tends to weaken the structural integrity of the resultant part. The more the pollutant is like the primary resin stream, the less the adverse affect on the strength of the material.

Colorant is added by auxiliary feed cylinders 33 and 35 to individual portions of the main resin stream in passageways 24 and 26 downstream of the feed screw of the primary feed tube 11. Accordingly, blending of the two added colorants is prevented in the nozzle 22 and, depending on the length of tubing the colorant has to be carried through prior to its arrival at its injection point into mold 13, blending of the two colorant masses with the primary molten resin stream is minimized. Depending on the specifics of the mold, by way of example, if a liquid mass of blue and red are added into a primary molten stream with a base color of yellow, if blending is kept to a minimum, areas of blue and red may appear in the end product that will be predominantly yellow. If the mold is quite large, however, the long tubing that must be traversed to reach the ultimate injection point will result in some blending that will produce green and orange in the end product.

Various changes, alternatives and modifications will become apparent after a reading of the foregoing specification. It is intended that all such changes, alternatives and modifications as fall within the scope of the appended claims be considered part of the present invention.

I claim:

1. Apparatus for adding color to a primary resin stream as it is fed from a primary feed tube to an injection mold to produce a multi-colored article, said apparatus comprising
   a) a nozzle attachable to a downstream end of said primary feed tube, said nozzle having a first passageway and a second separate passageway adjacent to said first passageway, each said passageway receiving substantially equal portions of said primary resin stream from said primary feed tube;
   b) a first laterally extending opening intersecting said first passageway;
   c) a second laterally extending opening intersecting said second passageway;
   d) a first fluid-operated auxiliary feeder connected to said first laterally extending opening for injecting a first color pigment into said primary resin stream occupying said first passageway;
   e) a second fluid-operated auxiliary feeder connected to said second laterally extending opening for injecting a second different color pigment into said primary resin stream occupying said second passageway;
   whereby blending of said pigment with said primary resin stream is minimized and said first and second color pigments will be dispersed substantially independently in said multi-colored article manufactured in said injection mold.

2. The apparatus of claim 1 wherein each said fluid-operated auxiliary feeder comprises a feed cylinder and a fluid-operated piston cylinder.

3. The apparatus of claim 2 further comprising a first aperture of reduced dimension formed in said first laterally extending opening and a second aperture of reduced dimension formed in said second laterally extending opening.

4. The apparatus of claim 2 further comprising first and second orifices formed in separate cylindrical members that thread into said first and second feed cylinders which, in turn, thread into laterally extending openings.

5. The apparatus of claim 2 wherein each said feed cylinder is equipped with a vertical hopper which empties into said feed cylinder through an elliptical chute, a major axis of said elliptical chute extending in the same direction as a longitudinal axis of a passageway in said feed cylinder.

6. The apparatus of claim 1 further comprising a second cylindrical element fit into a downstream end of said nozzle which receives said substantially equal portions of said resin stream from said nozzle and distributes said portions to said injection mold.

* * * * *